US010020103B2

(12) United States Patent
Watanabe et al.

(10) Patent No.: US 10,020,103 B2
(45) Date of Patent: Jul. 10, 2018

(54) GRAIN ORIENTED ELECTRICAL STEEL SHEET

(75) Inventors: Makoto Watanabe, Tokyo (JP); Seiji Okabe, Tokyo (JP); Toshito Takamiya, Tokyo (JP)

(73) Assignee: JFE Steel Corporation (JP)

( * ) Notice: Subject to any disclaimer, the term of this patent is extended or adjusted under 35 U.S.C. 154(b) by 415 days.

(21) Appl. No.: 13/824,722

(22) PCT Filed: Sep. 28, 2011

(86) PCT No.: PCT/JP2011/005455
§ 371 (c)(1),
(2), (4) Date: Mar. 18, 2013

(87) PCT Pub. No.: WO2012/042865
PCT Pub. Date: Apr. 5, 2012

(65) Prior Publication Data
US 2013/0189490 A1 Jul. 25, 2013

(30) Foreign Application Priority Data
Sep. 30, 2010 (JP) ................................ 2010-222916

(51) Int. Cl.
*B32B 3/26* (2006.01)
*H01F 3/02* (2006.01)
(Continued)

(52) U.S. Cl.
CPC ............ *H01F 3/02* (2013.01); *C21D 8/1283* (2013.01); *C22C 38/04* (2013.01); *C22C 38/34* (2013.01);
(Continued)

(58) Field of Classification Search
CPC .. C21D 8/1277; C21D 8/1283; C21D 8/1288; C21D 9/46; C23C 26/00; C22C 38/00; H01F 1/14783
(Continued)

(56) References Cited

U.S. PATENT DOCUMENTS 4,750,949 A * 6/1988 Kobayashi et al. .......... 148/111
6,287,703 B1 9/2001 Inokuti
(Continued)

FOREIGN PATENT DOCUMENTS

CN 1253658 5/2000
CN 1473965 2/2004
(Continued)

OTHER PUBLICATIONS

Machine translation of JP 2001-303215 Okabe et al, obtained from the JPO website.*
(Continued)

*Primary Examiner* — Megha M Gaitonde
(74) *Attorney, Agent, or Firm* — DLA Piper LLP (US)

(57) ABSTRACT

A grain oriented electrical steel sheet reduces local exfoliation of insulating coating films and thus has excellent corrosion resistance and insulation properties. The grain oriented electrical steel sheet may be obtained by, assuming that $a_1$ (μm) is a film thickness of the insulating coating at the floors of linear grooves and $a_2$ (μm) is a film thickness of the insulating coating on a surface of the steel sheet at portions other than the linear grooves, controlling $a_1$ and $a_2$ to satisfy the following formulas (1) and (2):

$$0.3\ \mu m \le a_2 \le 3.5\ \mu m \quad (1),$$

and $$a_1/a_2 \le 2.5 \quad (2).$$

4 Claims, 1 Drawing Sheet

(51) Int. Cl.

| | |
|---|---|
| ***C21D 8/12*** | (2006.01) |
| ***C22C 38/04*** | (2006.01) |
| ***C22C 38/34*** | (2006.01) |
| ***H01F 1/18*** | (2006.01) |
| ***C23C 22/33*** | (2006.01) |
| ***C23C 22/74*** | (2006.01) |

(52) U.S. Cl.
CPC .............. *C23C 22/33* (2013.01); *C23C 22/74* (2013.01); *H01F 1/18* (2013.01); *Y10T 428/24545* (2015.01)

(58) Field of Classification Search
USPC ....... 428/141, 142, 156, 161, 163, 167, 172, 428/173
See application file for complete search history.

(56) References Cited

U.S. PATENT DOCUMENTS

| | | | | |
|---|---|---|---|---|
| 6,565,674 | B1 * | 5/2003 | Kurosaki ............ | H01F 1/14775 148/111 |
| 2002/0157734 | A1 | 10/2002 | Senda et al. | |
| 2013/0189490 | A1 | 7/2013 | Watanabe et al. | |

FOREIGN PATENT DOCUMENTS

| | | | |
|---|---|---|---|
| EP | 2 623 634 | | 8/2013 |
| JP | 57-2252 | B2 | 1/1982 |
| JP | 62-53579 | B2 | 11/1987 |
| JP | 1-116085 | A | 5/1989 |
| JP | 3-69968 | B2 | 11/1991 |
| JP | 9-263951 | | 10/1997 |
| JP | 11-236682 | A | 8/1999 |
| JP | 11-310882 | A | 11/1999 |
| JP | 2001-303215 | A | 10/2001 |
| KR | 2002-0063515 | | 8/2002 |
| RU | 2 526 642 | | 8/2014 |

OTHER PUBLICATIONS

Office Action dated Feb. 5, 2014 for corresponding Canadian Application No. 2,810,137.

English translation of Notice of Reasons for Rejection dated Dec. 9, 2014 of Korean Application No. 2013-7007763.

Canadian Office Action dated Feb. 20, 2015 of corresponding Canadian Application No. 2,810,137.

Notice of Final Rejection dated Sep. 18, 2015 of corresponding Korean Application No. 2013-7007763 along with an English translation.

Notice of Grounds for Rejection dated May 8, 2015of corresponding Korean Application No. 2013-7007763 along with its English translation.

Japanese Office Action dated Jun. 2, 2015 of corresponding Japanese Application No. 2010-222916 along with its English translation.

Canadian Office Action dated Jul. 8, 2015 of corresponding Canadian Application No. 2,810,137.

European Office Action dated Feb. 12, 2016, of corresponding European Application No. 11828431.4.

Korean Office Action dated Apr. 20, 2018, of corresponding Korean Application No. 10-2013-7007763, along with a Concise Statement of Relevance of Office Action in English.

* cited by examiner

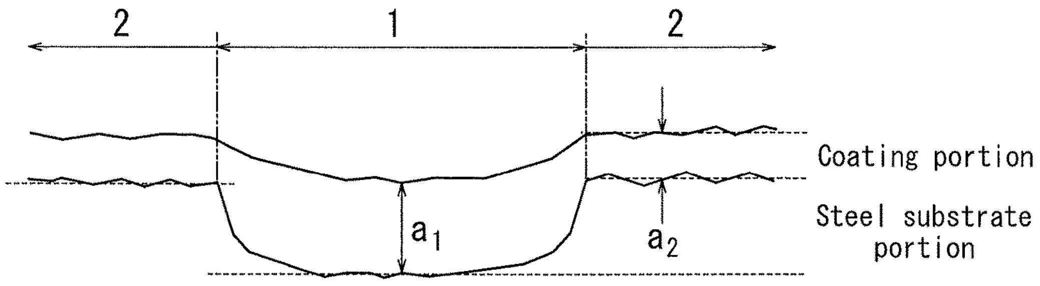
2
1
2
Coating portion
Steel substrate portion
a1
a2

GRAIN ORIENTED ELECTRICAL STEEL SHEET

RELATED APPLICATIONS

This application is a § 371 of International Application No. PCT/JP2011/005455, with an international filing date of Sep. 28, 2011 (WO 2012/042865 A1, published Apr. 5, 2012), which is based on Japanese Patent Application No. 2010-222916, filed Sep. 30, 2010, the subject matter of which is incorporated herein by reference.

TECHNICAL FIELD

This disclosure relates to grain oriented electrical steel sheets for use in iron core materials of transformers or the like.

BACKGROUND

Grain oriented electrical steel sheets, which are mainly used as iron cores of transformers, are required to have excellent magnetic properties, in particular, less iron loss. To meet this requirement, it is important that secondary recrystallized grains are highly aligned in the steel sheet in the (110)[001] orientation (or so-called "Goss orientation") and impurities in the product steel sheet are reduced. However, there are limitations to control crystal orientation and reduce impurities in terms of balancing with manufacturing cost, and so on. Accordingly, there have been developed techniques for iron loss reduction, which is to apply non-uniform strain to a surface of a steel sheet physically to subdivide magnetic domain width, i.e., magnetic domain refining techniques.

For example, JP 57-002252 B proposes a technique for reducing iron loss of a steel sheet by irradiating a final product steel sheet with a laser, introducing a high dislocation density region to the surface layer of the steel sheet and reducing the magnetic domain width. In addition, JP 62-053579 B proposes a technique of refining magnetic domains by forming linear grooves having a depth of more than 5 μm on the steel substrate portion of a steel sheet after being subjected to final annealing at a load of 882 MPa to 2156 MPa (90 kgf/mm$^2$ to 220 kgf/mm$^2$), and then subjecting the steel sheet to heat treatment at a temperature of 750° C. or higher. Moreover, JP 3-069968 B proposes a technique of introducing linear notches (grooves) of 30 μm to 300 μm wide and 10 μm to 70 μm deep, in a direction substantially perpendicular to the rolling direction of a steel sheet, at intervals of 1 mm or more in the rolling direction.

With the development of the magnetic domain refining techniques as above, it is now becoming possible to obtain grain oriented electrical steel sheets having good iron loss properties.

Usually, however, in the case of using a technique of forming grooves on a surface of a steel sheet, there is a tendency that the coating is applied more heavily to the floors of grooves due to the liquid flowing into the grooves from their circumference while the coating is being applied. This results in larger differences in coating film thickness between the grooves and portions other than the grooves. Consequently, there is a problem of a non-uniform distribution of the tension applied by the coating, causing strong local stress to be exerted on the grooves. Further, any external stress applied due to sheet passage through a manufacturing line or the like would be unsustainable for those portions to which local stress has already been applied as described above, thereby causing partial exfoliation and defects of the film. Such defects pose problems associated with deterioration in corrosion resistance as well as loss of insulation resistance.

It could therefore be helpful to provide such a grain oriented electrical steel sheet that may reduce local exfoliation of insulation coating films and has excellent corrosion resistance and insulation properties.

SUMMARY

We thus provide:

[1] A grain oriented electrical steel sheet comprising: linear grooves provided on a surface of the steel sheet; and insulating coating applied to the surface, wherein assuming that $a_1$ (μm) denotes a film thickness of the insulating coating at the floors of the linear grooves and $a_2$ (μm) denotes a film thickness of the insulating coating on the surface of the steel sheet at portions other than the linear grooves, $a_1$ and $a_2$ satisfy Formulas (1) and (2):

$$0.3\ \mu m \le a_2 \le 3.5\ \mu m \quad (1),\ \text{and}$$

$$a_1/a_2 \le 2.5 \quad (2).$$

[2] The grain oriented electrical steel sheet according to [1] above, wherein the insulation coating is provided by using a roll coater to apply and then dry a coating treatment liquid having a viscosity of 1.2 cP or more.

It is thus possible to provide a grain oriented electrical steel sheet that may reduce local exfoliation of insulating coating films and has excellent corrosion resistance and insulation properties.

BRIEF DESCRIPTION OF THE DRAWING

FIG. 1 is a schematic diagram illustrating parameters of our steel sheets including a coating film thickness $a_1$ (μm) at the floor of a linear groove and a coating film thickness $a_2$ (μm) at portions other than the linear groove.

REFERENCE SIGNS LIST

1 Linear groove
2 Portions other than linear groove

DETAILED DESCRIPTION

Our steel sheets and methods will be specifically described below. Usually, when linear grooves (hereinafter, referred to simply as "grooves") are formed on a surface of a steel sheet, the following processes are carried out to ensure the insulation property of the steel sheet: grooves are first formed on the surface of the steel sheet, then a forsterite film is formed on the surface and, thereafter, a film for insulation (hereinafter, referred to "insulating coating" or simply as "coating") is applied to the surface.

During decarburization in manufacturing a grain oriented electrical steel sheet, an internal oxidation layer, which is mainly composed of $SiO_2$, is formed on a surface of the steel sheet, and then an annealing separator containing MgO is applied on the surface. Subsequently, the forsterite film is formed during final annealing at a high temperature for a long period of time such that the internal oxidation layer is allowed to react with MgO. On the other hand, the insulating coating to be applied on the forsterite film by top coating may be provided by application of a coating liquid and subsequent baking.

When these films are quenched to a normal temperature after being formed at high temperature for application, those films having a small contraction rate serve to apply tensile stress to the steel sheet as a function of their differences in thermal expansion coefficient from the steel sheet.

An increase in the film thickness of the insulating coating leads to an increase in the tension applied to the steel sheet, which is more effective in improving iron loss properties. On the other hand, there has been a tendency that the stacking factor (the proportion of the steel substrate) decreases at the time of assembling an actual transformer and that the transformer iron loss (building factor) decreases relative to the material iron loss. Accordingly, conventional methods only control the film thickness (coating weight per unit area) of the steel sheet as a whole.

FIG. 1 is a schematic diagram illustrating a coating film thickness $a_1$ of the floors of linear grooves and a coating film thickness $a_2$ of portions other than the linear grooves. In FIG. 1, reference numeral 1 is the linear groove and reference numeral 2 is the portions other than the linear groove. In addition, the lower ends of $a_1$ and $a_2$ represent the respective interfaces between the insulating coating and the forsterite film. We found that these problems may be addressed by controlling the coating film thickness $a_1$ and coating film thickness $a_2$ illustrated in FIG. 1.

The coating film thickness $a_2$ needs to satisfy Formula (1) below. This is because if the coating film thickness $a_2$ is below 0.3 μm, the insulating coating becomes so thin that the interlaminar resistance and corrosion resistance deteriorate. Alternatively, if $a_2$ is above 3.5 μm, the assembled actual transformer has a larger stacking factor.

$$0.3\ \mu m \le a_2 \le 3.5\ \mu m \quad (1)$$

Then, as an important point, the coating film thicknesses $a_1$ and $a_2$ as need to satisfy Formula (2):

$$a_1/a_2 \le 2.5 \quad (2).$$

This is because controlling this ratio within the above-described range allows uniform tension to be applied to the steel sheet by the coating, which results in fewer portions to which strong local stress is applied and eliminates the phenomenon of exfoliation of the film. The lower limit of the above Formula (2) is preferably 0.4 in terms of more uniform application of tension.

It is also preferable to use hard rolls as coater rolls to form the insulating coating. In this case, it is also desirable that the coating liquid has a viscosity of 1.2 cP or more. It is assumed that the viscosity of the coating liquid is determined at a point in time when the temperature of the liquid is 25° C. This is because satisfying the above-described viscosity range may avoid an undue increase in the film thickness $a_1$ at the floors of grooves due to the liquid excessively flowing into the grooves following the application of the coating liquid.

A slab for a grain oriented electrical steel sheet may have any chemical composition that causes secondary recrystallization having a great magnetic domain refining effect. As secondary recrystallized grains have a smaller deviation angle from Goss orientation, a greater effect of reducing iron loss can be achieved by magnetic domain refinement. Therefore, the deviation angle from Goss orientation is preferably 5.5° or less. As used herein, the deviation angle from Goss orientation is the square root of $(\alpha^2+\beta^2)$, where α represents an α angle (a deviation angle from the (110)[001] ideal orientation around the axis in normal direction (ND) of the orientation of secondary recrystallized grains); and β represents a β angle (a deviation angle from the (110)[001] ideal orientation around the axis in transverse direction (TD) of the orientation of secondary recrystallized grains). The deviation angle from Goss orientation was measured by performing orientation measurement on a sample of 280 mm×30 mm at pitches of 5 mm. In this case, averages of the absolute values of α angle and β angle were determined and considered as the values of the above-described α and β, while ignoring any abnormal values obtained at the time of measuring grain boundary and so on. Accordingly, the values of α and β each represent an average per area, not an average per crystal grain.

In addition, regarding the compositions and manufacturing methods described below, numerical range limitations and selective elements/steps are merely illustrative of representative methods of manufacturing a grain oriented electrical steel sheet. Hence, our steel sheets and methods are not limited to the disclosed arrangements.

If an inhibitor, e.g., an AlN-based inhibitor is used, Al and N may be contained in an appropriate amount, respectively, while if a MnS/MnSe-based inhibitor is used, Mn and Se and/or S may be contained in an appropriate amount, respectively. Of course, these inhibitors may also be used in combination. In that case, preferred contents of Al, N, S and Se are: Al: 0.01 mass % to 0.065 mass %; N: 0.005 mass % to 0.012 mass %; S: 0.005 mass % to 0.03 mass %; and Se: 0.005 mass % to 0.03 mass %, respectively.

Further, we provide a grain oriented electrical steel sheet having limited contents of Al, N, S and Se without using an inhibitor. In that case, the contents of Al, N, S and Se are preferably limited to Al: 100 mass ppm or less, N: 50 mass ppm or less, S: 50 mass ppm or less, and Se: 50 mass ppm or less, respectively.

The basic elements and other optionally added elements of the slab for a grain oriented electrical steel sheet will be specifically described below.

C≤0.15 mass %

Carbon (C) is added to improve the texture of a hot-rolled sheet. However, C content in steel exceeding 0.15 mass % makes it more difficult to reduce the C content to 50 mass ppm or less where magnetic aging will not occur during the manufacturing process. Thus, the C content is preferably 0.15 mass % or less. Besides, it is not necessary to set up a particular lower limit to the C content because secondary recrystallization is enabled by a material not containing C.

2.0 mass %≤Si≤8.0 mass %

Silicon (Si) is an element effective to enhance electrical resistance of steel and improve iron loss properties thereof. However, Si content in steel below 2.0 mass % cannot provide a sufficient effect of improving iron loss. On the other hand, Si content in steel above 8.0 mass % significantly deteriorates formability and also decreases flux density of the steel. Accordingly, the Si content is preferably 2.0 mass % to 8.0 mass %.

0.005 mass %≤Mn≤1.0 mass %

Manganese (Mn) is an element necessary to achieve better hot workability of steel. However, Mn content in steel below 0.005 mass % cannot provide such a good effect of manganese. On the other hand, Mn content in steel above 1.0 mass % deteriorates magnetic flux of a product steel sheet. Accordingly, the Mn content is preferably 0.005 mass % to 1.0 mass %.

Further, in addition to the above elements, the slab may also contain the following elements as elements to improve magnetic properties as deemed appropriate:

at least one element selected from Ni: 0.03 mass % to 1.50 mass %, Sn: 0.01 mass % to 1.50 mass %, Sb: 0.005 mass % to 1.50 mass %, Cu: 0.03 mass % to 3.0 mass %, P: 0.03 mass % to 0.50 mass %, Mo: 0.005 mass % to 0.10 mass %, and Cr: 0.03 mass % to 1.50 mass %.

Nickel (Ni) is an element useful to improve the microstructure of a hot rolled steel sheet for better magnetic properties thereof. However, Ni content in steel below 0.03 mass % is less effective in improving magnetic properties, while Ni content in steel above 1.50 mass % makes secondary recrystallization of the steel unstable, thereby deteriorating magnetic properties thereof. Thus, Ni content is preferably 0.03 mass % to 1.50 mass %.

In addition, tin (Sn), antimony (Sb), copper (Cu), phosphorus (P), molybdenum (Mo) and chromium (Cr) are useful elements to improve magnetic properties of steel. However, each of these elements becomes less effective in improving magnetic properties of the steel when contained in steel in an amount less than the aforementioned lower limit or, alternatively, when contained in steel in an amount exceeding the aforementioned upper limit, inhibits the growth of secondary recrystallized grains of the steel. Thus, each of these elements is preferably contained within the respective ranges thereof specified above.

The balance other than the above-described elements is Fe and incidental impurities incorporated during the manufacturing process.

Then, the slab having the above-described chemical composition is subjected to heating before hot rolling in a conventional manner. However, the slab may also be subjected to hot rolling directly after casting, without being subjected to heating. In the case of a thin slab, it may be subjected to hot rolling or proceed to the subsequent step, omitting hot rolling.

Further, the hot rolled sheet is optionally subjected to hot band annealing. At that moment, to obtain a highly-developed Goss texture in a product sheet, a hot band annealing temperature is preferably 800° C. to 1200° C. If a hot band annealing temperature is lower than 800° C., there remains a band texture resulting from hot rolling, which makes it difficult to obtain a primary recrystallization texture of uniformly-sized grains and impedes the growth of secondary recrystallization. On the other hand, if a hot band annealing temperature exceeds 1200° C., the grain size after the hot band annealing coarsens too much, which makes it extremely difficult to obtain a primary recrystallization texture of uniformly-sized grains.

After hot band annealing, the sheet is subjected to cold rolling once, or twice or more with intermediate annealing performed therebetween, followed by primary recrystallization annealing and application of an annealing separator to the sheet. The steel sheet may also be subjected to nitridation or the like to strengthen any inhibitor, either during primary recrystallization annealing, or after primary recrystallization annealing and before initiation of the secondary recrystallization. After application of the annealing separator prior to secondary recrystallization annealing, the sheet is subjected to final annealing for purposes of secondary recrystallization and formation of a forsterite film.

As described below, formation of grooves may be performed at any time as long as it is after final cold rolling such as before or after the primary recrystallization annealing, before or after the secondary recrystallization annealing, before or after the flattening annealing, and so on. However, if grooves are formed after tension coating, it requires extra steps to remove some portions of the film to make room for grooves, form the grooves in the removed portions in the manner described below, and re-form those portions of the film. Accordingly, formation of grooves is preferably performed after final cold rolling and before forming tension coating.

After final annealing, it is effective to subject the sheet to flattening annealing to correct its shape. A tension coating is applied to a surface of the steel sheet before or after flattening annealing. It is also possible to apply a tension coating treatment liquid prior to the flattening annealing to combine flattening annealing with baking of the coating.

When applying tension coating to the steel sheet, it is important to appropriately control, as mentioned earlier, the coating film thickness $a_1$ (μm) at the floors of the linear grooves and the coating film thickness $a_2$ (μm) at the portions other than the linear grooves.

As used herein, the term "tension coating" indicates an insulating coating that applies tension to the steel sheet to reduce iron loss. It should be noted that any tension coating is advantageously applicable that contains silica and phosphate as its principal components, including, e.g., composite hydroxide-based coating, aluminum borate-based coating and so on. However, as a tension coating agent, the viscosity is desirably 1.2 cP or more, as described above.

Grooves are formed by different methods including conventionally well-known methods of forming grooves, e.g., a local etching method, a scribing method using cutters or the like, a rolling method using rolls with projections, and so on. The most preferable method involves adhering, by printing or the like, an etching resist to a steel sheet after being subjected to final cold rolling, and then forming grooves on a non-adhesion region of the steel sheet through some process such as electrolytic etching. This is because in a method where grooves are mechanically formed, the resulting grooves have non-uniform widths and depths due to severe abrasion of the cutters, rolls and so on, which makes it difficult to obtain a stable magnetic domain refining effect.

It is preferable that grooves are formed on a surface of the steel sheet at intervals of about 1.5 mm to 20.0 mm, and at an angle of about ±30° relative to a direction perpendicular to the rolling direction so that each groove has a width of about 50 μm to 300 μm and a depth of about 10 μm to 50 μm. As used herein, "linear" is intended to encompass solid lines as well as dotted lines, dashed lines and so on.

Except the above-mentioned steps and manufacturing conditions, it is possible to use, as appropriate, a conventionally well-known method of manufacturing a grain oriented electrical steel sheet where magnetic domain refining treatment is applied by forming grooves.

EXAMPLE 1

Steel slabs were manufactured by continuous casting, each steel slab having a composition containing, in mass %: C: 0.05%; Si: 3.2%; Mn: 0.06%; Se: 0.02%; Sb: 0.02%; and the balance being Fe and incidental impurities. Then, each of these steel slabs was heated to 1400° C., subjected to subsequent hot rolling to be finished to a hot-rolled sheet having a sheet thickness of 2.6 mm, and then subjected to hot band annealing at 1000° C. Then, each steel sheet was subjected to cold rolling twice, with intermediate annealing performed therebetween at 1000° C., to be finished to a cold-rolled sheet having a final sheet thickness of 0.30 mm.

Thereafter, each steel sheet was applied with etching resist by gravure offset printing, and subjected to electrolytic etching and resist stripping in an alkaline solution, whereby linear grooves, each having a width of 150 μm and a depth of 20 μm, were formed at intervals of 3 mm at an angle of 10° relative to a direction perpendicular to the rolling direction.

Then, each steel sheet was subjected to decarburizing annealing at 825° C., then applied with an annealing separator composed mainly of MgO, and subjected to subsequent final annealing for secondary recrystallization and purification under the conditions of 1200° C. and 10 hours.

Then, each steel sheet was applied with a tension coating treatment solution containing 40 mass parts of colloidal silica, 50 mass parts of monomagnesium phosphate, 9.5 mass parts of chromic anhydride and 0.5 mass parts (in solid content equivalent) of silica powder, and subjected to flattening annealing at 830° C. during which the tension coating was also baked simultaneously, to thereby provide a product steel sheet. In this case, as shown in Table 1, a coating was applied, dried and baked under different film thickness conditions while changing the coating liquid viscosity. These products were used to manufacture oil-immersed transformers at 1000 kVA, for which stacking factor, rust ratio and interlaminar resistance were measured.

The stacking factor and interlaminar resistance of each product were measured according to the method specified in JIS C2550, while the rust ratio was measured by visually determining the rust ratio of the product after holding the product in the atmosphere with a temperature of 50° C. and a dew point of 50° C. for 50 hours.

The above-described measurement results are shown in Table 1.

insulation properties. In addition, the grain oriented electrical steel sheets of Experiment Nos. 5 and 6, the upper limits of which do not satisfy Formula (1), exhibited inferior stacking factors.

The invention claimed is:

1. A grain oriented electrical steel sheet comprising: linear grooves having a depth of 10 μm to 50 μm and a width of 50 μm to 300 μm provided on a surface of the steel sheet; a forsterite film on the surface of the grain oriented electrical steel sheet including a surface of the linear grooves; and an insulating coating applied directly to the surface of the forsterite film, wherein assuming that $a_1$ (μm) denotes a film thickness of the insulating coating at the floors of the linear grooves and $a_2$ (μm) denotes a film thickness of the insulating coating on the surface of the steel sheet at portions other than the linear grooves, $a_1$ and $a_2$ satisfy formulae (1) and (2):

$$0.3\ \mu m \leq a_2 \leq 3.5\ \mu m \quad (1),$$

and $$0.4 \leq a_1/a_2 \leq 2.5 \quad (2).$$

2. The grain oriented electrical steel sheet according to claim 1, wherein the insulation coating is formed by apply-

TABLE 1

| Experiment No | Viscosity (cP) | Film Thickness at Floors of Grooves $a_1$ (μm) | Film Thickness at Portions other than Grooves $a_2$ (μm) | $a_1/a_2$ | Stacking Factor (%) | Rust Ratio (%) | Interlaminar Resistance (Ω · cm²) | Remarks |
|---|---|---|---|---|---|---|---|---|
| 1 | 1.2 | 0.4 | 0.2 | 2.0 | 98.0 | 10 | 20 | Comparative Example |
| 2 | 1.2 | 0.7 | 0.4 | 1.8 | 97.8 | ≤5 | ≥200 | Example |
| 3 | 1.4 | 2.9 | 1.5 | 1.9 | 97.6 | ≤5 | ≥200 | Example |
| 4 | 1.4 | 4.5 | 3.2 | 1.4 | 97.3 | ≤5 | ≥200 | Example |
| 5 | 1.5 | 7.2 | 3.9 | 1.8 | 96.8 | ≤5 | ≥200 | Comparative Example |
| 6 | 1.6 | 8.5 | 4.5 | 1.9 | 96.6 | ≤5 | ≥200 | Comparative Example |
| 7 | 1.2 | 3.3 | 2.3 | 1.4 | 97.6 | ≤5 | ≥200 | Example |
| 8 | 1.1 | 4.9 | 2.2 | 2.2 | 97.7 | 5 | ≥200 | Example |
| 9 | 1.1 | 6.1 | 1.9 | 3.2 | 97.6 | 25 | 10 | Comparative Example |
| 10 | 1.0 | 6.6 | 2.0 | 3.3 | 97.3 | 40 | 10 | Comparative Example |

* Stacking Factor, Interlaminar Resistance: measured under JIS C2550.
Rust Ratio: visually determined by measuring the rust ratio of each product after being held in atmosphere with temperature of 50° C. and dew point of 50° C. for 50 hours.

As shown in Table 1, all of our grain oriented electrical steel sheets of Experiment Nos. 2 to 4, 7 and 8 that satisfy the above Formulas (1) and (2) exhibited excellent corrosion resistance properties (low rust ratio) and excellent insulation properties (high interlaminar resistance), without local exfoliation of insulation coating films.

However, the grain oriented electrical steel sheets of Experiment No. 1, the lower limit of which does not satisfy Formula (1), as well as the grain oriented electrical steel sheets of Experiment Nos. 9 and 10 that do not satisfy Formula (2) exhibited inferior corrosion resistance and ing coating treatment liquid having a viscosity of 1.2 cP or more with a roll coater and dried.

3. The grain oriented electrical steel sheet according to claim 1, wherein the deviation angle of secondary recrystallized grains from Goss orientation is 5.5° or less.

4. The grain oriented electrical steel sheet according to claim 2, wherein the deviation angle of secondary recrystallized grains from Goss orientation is 5.5° or less.

* * * * *